US005389138A

United States Patent [19]

Harry, Jr.

[11] Patent Number: 5,389,138

[45] Date of Patent: Feb. 14, 1995

[54] OVEN PRETREATMENT AND CLEANING COMPOSITION CONTAINING SILICONE

[75] Inventor: David R. Harry, Jr., Oak Ridge, N.C.

[73] Assignee: Kay Chemical Company, Greensboro, N.C.

[21] Appl. No.: 41,227

[22] Filed: Mar. 31, 1993

[51] Int. Cl.[6] .......... C09K 3/00; F24C 15/20; B32B 19/00

[52] U.S. Cl. .......... 106/287.14; 134/2; 134/4; 134/39; 134/42; 427/156; 427/397.8; 428/447

[58] Field of Search .......... 252/140, 145, 156; 106/287.14; 134/2, 4, 39, 42

[56] References Cited

U.S. PATENT DOCUMENTS

| | | | |
|---|---|---|---|
| 1,943,519 | 1/1934 | Denning | 87/5 |
| 2,367,918 | 1/1945 | Bartel | 117/89 |
| 3,183,110 | 5/1965 | Aler et al. | 106/287 |
| 3,196,027 | 7/1965 | White et al. | 106/287 |
| 3,303,052 | 2/1967 | Hatch et al. | 117/169 |
| 3,542,574 | 11/1970 | Payne | 106/287.14 |
| 3,544,366 | 12/1970 | Uhlmann | 134/2 |
| 3,615,826 | 10/1971 | Brill | 134/29 |
| 3,658,711 | 4/1972 | Mukai et al. | 252/90 |
| 3,672,993 | 6/1972 | Mitchell et al. | 134/3 |
| 3,681,122 | 8/1972 | Domicone et al. | 117/124 |
| 3,736,254 | 5/1973 | Croom | 210/51 |
| 3,784,404 | 1/1974 | Cavanaugh | 117/97 |
| 3,827,983 | 8/1974 | Mitchell et al. | 252/89 |
| 3,846,172 | 11/1974 | Fossati | 134/4 |
| 3,910,854 | 10/1975 | Meyer | 252/523 |
| 3,941,713 | 3/1976 | Dawson et al. | 252/142 |
| 4,019,998 | 4/1977 | Benson et al. | 252/135 |
| 4,019,999 | 4/1977 | Ohren et al. | 252/140 |
| 4,040,972 | 8/1977 | Roebke et al. | 252/972 |
| 4,105,574 | 8/1978 | Culmone et al. | 252/154 |
| 4,116,848 | 9/1978 | Schoenholz et al. | 252/90 |
| 4,124,523 | 11/1978 | Johnson | 252/145 |
| 4,131,558 | 12/1978 | Bailey et al. | 252/135 |
| 4,157,921 | 6/1979 | Baturay et al. | 134/4 |
| 4,184,975 | 1/1980 | Krings et al. | 252/140 |
| 4,214,915 | 7/1980 | Dillarstone et al. | 134/19 |
| 4,439,343 | 3/1984 | Albanese | 252/305 |
| 4,474,835 | 10/1984 | Brewer | 427/387 |
| 4,512,908 | 4/1985 | Heile | 252/160 |
| 4,528,039 | 7/1985 | Rubin et al. | 134/2 |
| 4,877,691 | 10/1989 | Cockrell | 428/688 |
| 5,080,824 | 1/1992 | Bindl et al. | 252/174.15 |
| 5,137,793 | 8/1992 | Cockrell | 428/688 |

FOREIGN PATENT DOCUMENTS

| | | |
|---|---|---|
| 2069771 | 9/1971 | France . |
| 1039495 | 8/1966 | United Kingdom . |
| 1275740 | 5/1972 | United Kingdom . |

*Primary Examiner*—Paul E. Konopka
*Attorney, Agent, or Firm*—Finnegan, Henderson, Farabow, Garrett & Dunner

[57] ABSTRACT

A food-safe composition for the pretreatment of a surface, preferably an oven or a broiler, which may be subjected to heat is liable to soiling by organic food deposits, especially baked-on food deposits. A food-safe, inorganic thickening agent which is substantially insoluble in an alkaline aqueous composition and which is present in an amount sufficient so that, during application to the surface, the composition is capable of forming a continuous coating adhered to all desired portions of the surface, is combined with (1) an alkaline, food-safe, water-soluble inorganic salt in an amount sufficient so that the composition is readily removable with water or an aqueous solution after the composition has been dried and soiled, (2) a food-safe silicon polymer present in an amount sufficient so that the composition is transparent after it has been applied, dried, heated, and soiled, and optionally (3) a food-safe mineral oil present in an amount sufficient, in combination with the amount of the silicone polymer, so that the composition remains transparent or translucent after it has been applied, dried, heated, and soiled. The composition forms a transparent or translucent film after drying, preferably by heating, which remains continuous over all portions of the surface, including areas which may already be soiled with food deposits. After the film accumulates additional food soils, it remains substantially transparent. The soiled film can be readily removed by contact with water or an aqueous solution.

21 Claims, No Drawings

OVEN PRETREATMENT AND CLEANING COMPOSITION CONTAINING SILICONE

BACKGROUND OF THE INVENTION

The present invention relates to the pretreatment and cleaning of surfaces such as the surfaces of cooking equipment, for example, ovens or broilers (preferably ovens or broilers used commercially, as, for example, in a fast food restaurant), that are subject to heat and are liable to soiling by organic food deposits, especially baked-on organic food deposits. The soil deposited on these surfaces typically consists of a complex mixture of natural fats and other organic deposits from the cooking of food. When heated at normal oven or broiler operating temperatures, this soiling matter is often converted into a polymeric mass in which part of the organic material is carbonized.

Removal of this soil is a considerable problem, especially in restaurants where ovens and broilers are used to cook large amounts of food and soil levels are high. Removal of badly burned soils requires the use of highly alkaline, unsafe oven cleaners (typically based on sodium or potassium hydroxide) and/or laborious scrubbing and scraping. The time, effort, and safety risk involved are such significant deterrents to regular cleaning that restaurant ovens, broilers, and other surfaces liable to soiling by organic food deposits are often chronically soiled.

Oven cleaners containing alkali materials less alkaline than caustic soda are known. For example, U.S. Pat. No. 3,658,711 issued Apr. 25, 1972 to Mukai et al., and British Patent No. 1,275,740 published May 24, 1972 disclose the use of alkali metal phosphates combined with an amine component or "enhancing agent" and other optional ingredients such as, for example, surfactants, abrasives, thickening agents or suspending agents. However, such oven cleaners are not very effective in saponifying baked-on fat and consequently are not efficient oven cleaners. Further, such products, when applied to soiled oven surfaces, must attack the soiling matter from the outer surface, while the most severe polymerization and carbonization are generally present at the interior of the soil layer, adjacent to the oven wall.

Oven pretreatment compositions, which are applied to oven surfaces prior to soiling and then removed after soiling, are also known. For instance, U.S. Pat. No. 4,877,691 to Cockrell discloses a composition comprising an inorganic thickening agent and an alkaline, water-soluble inorganic salt. The composition forms a food-safe coating that adheres to all portions of an oven surface and, in a clean oven, remains continuous as the coating dries. The resulting dried film is resistant to scuffing and chipping at typical oven temperatures and prevents fats and other food soils from burning onto exposed oven surfaces. After soiling, the film and the accompanying spattered food soils are easily removable with water or an aqueous solution.

However, the composition of U.S. Pat. No. 4,877,691 typically dries to form a film which may be hazy or opaque in appearance. This hazy or opaque appearance tends to obscure, at least to some extent, the original surface of the oven and may be considered aesthetically undesirable by some users. Thus, there is a need in the art for a composition that dries to form a more transparent film.

U.S. Pat. No. 5,137,793 to Cockrell discloses another oven pretreatment composition comprising an inorganic thickening agent, an alkaline, water-soluble inorganic salt, and a high-boiling organic component. This composition forms a food-safe coating that adheres continuously to all portions of an oven surface, including areas which are already soiled by food deposits, as the coating dries. The resulting dried film is resistant to scuffing and chipping at typical oven temperatures, is substantially transparent after drying, and prevents fats and other food soils from burning onto exposed oven surfaces. After accumulating additional food soils, the soiled film is readily removed by contact with water or an aqueous solution.

At oven temperatures above 475° F., however, the carbon-carbon backbone of the high-boiling organic component of the composition of U.S. Pat. No. 5,137,793 is subject to breakdown. The resulting smoking and browning usually causes the film to become opaque, depending on the length of time after application, the temperature, and the degree of soiling. This hazy or opaque appearance, as explained above, is considered aesthetically undesirable by some users.

Thus, there is a need in the oven cleaning art for a pretreatment composition which can be applied to a desired clean or soiled surface to form a continuous coating, which dries to form a substantially transparent and continuous film, which remains substantially transparent at elevated oven temperatures such that the original oven surface remains visible, and which is quickly and easily removed by contact with water or an aqueous solution after accumulating additional food soils during oven use.

SUMMARY OF THE INVENTION

It has been found, according to the present invention, that compositions can be prepared that result in coatings with excellent adhesion and transparency or translucence that remain continuous as the coatings dry, even over portions of a desired surface having previously accumulated food soils. Specifically, it has been found that certain compositions, applied in an aqueous or nonaqueous liquid, solid, or semisolid form, form alkaline, food-safe coatings that are continuous and adhere to all desired surfaces subjected to heat and liable to soiling with organic food deposits. The resulting dried durable films are resistant to scuffing or chipping.

Moreover, the compositions of the invention produce dried films that are continuous and substantially transparent (i.e., transparent or translucent) after drying and that remain continuous and substantially transparent after being subjected to heating at oven temperatures. This preserves the original appearance of the pretreated surface when heated to temperatures at which previously known compositions would lose their substantial transparency. The soiled films are readily removed by contact with water or an aqueous solution.

Additional features and advantages of the invention will be set forth in the description below, and in part will be apparent from the description or may be learned by practice of the invention. The objectives and other advantages of the invention will be realized and attained by the compositions and methods particularly pointed out in the written description and claims.

To achieve these and other advantages in accordance with the purpose of the invention, as embodied and broadly described, one aspect of the present invention is a food-safe composition for the pretreatment of a surface which is liable to soiling by organic food deposits. This composition consists essentially of:

a. a food-safe, inorganic thickening agent which is substantially insoluble in an alkaline aqueous composition and which is present in an amount sufficient so that, during application to the surface, the composition is capable of forming a continuous coating adhered to all desired portions of the surface;

b. an alkaline, food-safe, water-soluble inorganic salt in an amount sufficient so that the composition is readily removable with water or an aqueous solution after the composition has been dried and soiled;

c. a food-safe silicone polymer of the formula I $$(CH_3)_3SiO[SiO(CH_3)_2]_nSi(CH_3)_3 \quad (I)$$

wherein n represents the number of polymer units needed to give the overall silicone polymer a minimum viscosity of 350 centistokes, which is present in an amount sufficient so that the continuous coating is transparent or translucent after the composition has been applied to the surface, dried and heated; and optionally d. a food-safe mineral oil, wherein, when said food-safe mineral oil is included in said food-safe composition, said mineral oil and said silicone polymer are present in a combined amount sufficient so that the composition is transparent or translucent after the composition has been applied to the surface, dried and heated.

Another aspect of the present invention is a food-safe composition for the pretreatment of a surface which is subjected to heat and is liable to soiling by baked-on organic food deposits. The composition consists essentially of:

a. water;

b. a food-safe, inorganic thickening agent which is a smectite clay material and is present in an amount sufficient so that the composition is capable of forming a continuous coating adhered to all desired portions of the surface;

c. at least one alkaline, food-safe, water-soluble inorganic salt in an amount sufficient so that the composition is readily removable with water or an aqueous solution after the composition has been dried and soiled;

d. a food-safe silicone polymer of the formula I $$(CH_3)_3SiO[SiO(CH_3)_2]_nSi(CH_3)_3 \quad (I)$$

wherein n represents the number of polymer units needed to give the overall silicone polymer a minimum viscosity of 350 centistokes, which is present in an amount sufficient so that the continuous coating is transparent or translucent after the composition has been applied to the surface, dried and heated; and optionally e. a food-safe mineral oil, wherein, when said food-safe mineral oil is included in said food-safe composition, said mineral oil and said silicone polymer are present in a combined amount sufficient so that the composition is transparent or translucent after the composition has been applied to the surface, dried and heated.

Another aspect of the present invention is a food-safe composition for the pretreatment of a surface which is subjected to heat and is liable to soiling by baked-on organic food deposits. The composition consists essentially of:

a. water;

b. a food-safe, inorganic thickening agent which is a magnesium aluminum silicate, said thickening agent being present in said composition in a relative amount of about 0.5 to about 10 percent by weight, so that the composition is capable of forming a continuous coating adhered to all desired portions of the surface;

c. at least one alkaline, food-safe, water-soluble inorganic salt selected from the group consisting of tripotassium phosphate, trisodium phosphate, sodium tripolyphosphate and potassium tripolyphosphate in a relative amount in said composition of about 0.05 to about 67.0 percent by weight, so that the composition is readily removable with water or an aqueous solution after the composition has been dried and soiled;

d. food-safe silicone oil having a minimum kinematic viscosity of about 350 centistokes present in the composition in a relative amount of about 1 to 20 percent by weight, so that the continuous coating is transparent or translucent after the composition has been applied to the surface, dried and heated;

e. an FD&C # Dye present in said composition at a relative amount of about 0.01 to about 0.03 percent by weight; and optionally f. a food-safe white mineral oil present in the composition in a relative amount of 0–10 percent by weight, wherein when said mineral oil is included in said composition, said mineral oil and said silicone oil are present in a combined amount so that the composition is transparent or translucent after the composition has been applied to the surface, dried and heated;

In another aspect of the present invention, a continuous film is adhered to a surface which is liable to soiling by organic food deposits. The film having been dried consists essentially of:

a. a food-safe, inorganic thickening agent which is substantially stantially insoluble in an alkaline aqueous composition and which is present in an amount sufficient so that the film has been produced from a continuous coating adhered to all desired portions of the surface;

b. an alkaline, food-safe, water-soluble inorganic salt in an amount sufficient so that the film is readily removable with water or an aqueous solution after soiling;

c. a food-safe silicone polymer of the formula I $$(CH_3)_3SiO[SiO(CH_3)_2]_nSi(CH_3)_3 \quad (I)$$

wherein n is the number of polymer units needed to give the overall silicone polymer a minimum viscosity of 350 centistokes, which is present in an amount sufficient so that the film is transparent or translucent after it dries to the surface and is heated; and optionally d. a food-safe mineral oil, wherein, when said food-safe mineral oil is included in said food-safe composition, said mineral oil and said silicone polymer are present in a combined amount sufficient so that the composition is transparent or translucent after the composition has been applied to the surface, dried and heated.

Another aspect of the present invention, a continuous film is adhered to a surface which is subject to heat and liable to soiling by baked-on organic food deposits. The film having been dried consists essentially of:

a. a food-safe, inorganic thickening agent which is a smectite clay material substantially insoluble in an alkaline aqueous composition and which is present in an amount sufficient so that the film was produced by a continuous coating adhered to the surface;

b. at least one alkaline, food-safe, water-soluble inorganic salt selected from the group consisting of phosphates and condensed phosphates in an amount sufficient so that the film is readily removable with water or an aqueous solution after soiling; and c. a food-safe silicone oil having a minimum kinematic viscosity of about 350 centistokes, which is present in an amount sufficient so that the film is transparent or translucent after it adheres to the surface, dries and is heated; and optionally d. a food-safe mineral oil, wherein, when said food-safe mineral oil is included in said food-safe composition, said mineral oil and said silicone polymer are present in a combined amount sufficient so that the composition is transparent or translucent after the composition has been applied to the surface, dried and heated.

Still another aspect of the present invention involves a method for cleaning a desired surface which is liable to soiling by organic food deposits comprising the steps of: 'a. applying to the surface a food-safe composition comprising:

i. a food-safe, inorganic thickening agent which is substantially insoluble in an alkaline aqueous composition and which is present in an amount sufficient so that the composition is capable of forming a continuous coating adhered to all desired portions of the surface;

ii. an alkaline, food-safe, water-soluble inorganic salt in an amount sufficient so that the composition is readily removable with water or an aqueous solution after the composition has been dried and soiled;

iii. a food-safe silicone polymer of the formula I $$(CH_3)_3SiO[SiO(CH_3)_2]_nSi(CH_3)_3, \quad (I)$$

wherein n is the number of polymer units needed to give the overall silicone polymer a minimum viscosity of 350 centistokes, which is present in an amount sufficient so that the continuous coating is transparent or translucent after the composition has been applied to the surface, dried and heated; and optionally iv. a food-safe mineral oil, wherein, when said food-safe mineral oil is included in said food-safe composition, said mineral oil and said silicone polymer are present in a combined amount sufficient so that the composition is transparent or translucent after the composition has been applied to the surface, dried and heated;

b. drying the continuous coating on the surface;

c. allowing the film to become soiled; and d. removing the soiled film by contacting the soiled film with water or an aqueous solution.

Another aspect of the present invention is a method for cleaning a desired surface which is subject to heat and is liable to soiling by baked-on organic food deposits comprising the steps of:

a. applying to the surface a food-safe composition consisting essentially of:

i. water;

ii. a food-safe, inorganic thickening agent which is a smectite clay material substantially insoluble in an alkaline aqueous composition, and which is present in an amount sufficient so that the composition is capable of forming a continuous coating adhered to all desired portions of the surface;

iii. at least one alkaline, food-safe, water-soluble inorganic salt selected from the group consisting of phosphates and condensed phosphates in an amount sufficient so that the composition is readily removable with water or an aqueous solution after the composition has been dried and soiled;

iv. a food-safe polydimethylsiloxane polymer, which is present in an amount sufficient so that the composition is transparent or translucent after it has been applied to the surface, dried and heated; and optionally v. a food-safe mineral oil, wherein, when said food-safe mineral oil is included in said food-safe composition, said mineral oil and said silicone polymer are present in a combined amount sufficient so that the composition is transparent or translucent after the composition has been applied to the surface, dried and heated, to form a continuous coating on the surface;

b. drying the continuous coating on the surface;

c. allowing the film to become soiled; and d. removing the soiled film by contacting the soiled film with water or an aqueous solution.

Another aspect of the present invention is a method for cleaning a desired surface which is subjected to heat and is liable to soiling by baked-on organic food deposits comprising the steps of:

a. applying to the surface a food-safe composition consisting essentially of:

i. water;

ii. a food-safe, inorganic thickening agent which contains predominantly montmorillonite clay and is substantially insoluble in an alkaline aqueous composition, said thickening agent being present in said composition in a relative amount of about 0.5 to about 10.0 percent weight, so that the composition is capable of forming a continuous coating adhered to all desired portions of the surface.

iii. at least one alkaline, food-safe, water-soluble inorganic salt selected from the group consisting of tripotassium phosphate, sodium tripolyphosphate and potassium tripolyphosphate, present in said composition in a relative amount of about 0.05 to about 67.0 percent by weight, so that the composition is readily removable with water or an aqueous solution after the composition has been dried and soiled;

iv. food-safe silicone oil having a minimum kinematic viscosity of about 350 centistokes present in the composition in a relative amount of about 1 to 20 percent by weight, so that the continuous coating is transparent or translucent after the composition has been applied to the surface, dried and heated; and optionally v. a food-safe white mineral oil present in the composition in a relative amount of 0–10 percent by weight, wherein when said mineral oil is included in said composition, said mineral oil and said silicone oil are present in a combined amount so that the composition is transparent or translucent after the composition has been applied to the surface, dried and heated;

wherein the composition, prior to application to the surface, has a pH of about 11.5 to 12.5.

b. drying the continuous coating to form a film;

c. allowing the film to become soiled;

d. removing the soiled film by contacting the soiled film with water or an aqueous solution; and e. reapplying the composition to the surface after the removal step (d).

The compositions of the present invention result in coatings with excellent adhesion and substantial transparency that remain continuous and substantially transparent as the coatings dry. Further, the compositions of the present invention produce dried films that are continuous and substantially transparent after drying and that remain continuous and substantially transparent during and after heating of the desired surface to which the compositions are applied. The soiled films are readily removed by contact with water or an aqueous solution.

These and other objects, features, and advantages of the present invention will be made more apparent from the following description of the preferred embodiments. It is to be understood that both the foregoing general description and the following detailed description are exemplary and explanatory and are intended to provide further explanation of the invention as claimed.

DETAILED DESCRIPTION OF THE INVENTION

The silicone polymer used in the present invention can be any polydimethylsiloxane having the formula I $$(CH_3)_3SiO[SiO(CH_3)_2]_nSi(CH_3)_3, \quad (I)$$

wherein n is the number of polymer units needed to give the over-all silicone polymer a minimum viscosity of 350 centistokes.

Preferred silicone oils containing a polydimethylsiloxane of the formula I have a minimum kinematic viscosity of 350 centistokes and can range to 500 or 1000 centistokes or higher (such as 60,000), depending on the number of $[SiO(CH_3)_2]$ polymer units.

Without being bound by theory, it is believed that the chemical structure of the silicone polymers of this invention enable it to perform in applications where compositions containing organic components would not be suitable. The silicon-oxygen bonds which form the polymer backbone are similar to the silicon-oxygen bonds of temperature resistant inorganic materials such as quartz, glass, and sand. These bonds are more resistant to oxidation, shear, and decomposition at elevated temperatures than are the carbon-carbon bonds of organic molecules. As a result the compositions of this invention are preferably able to remain transparent at temperatures up to about 580° F.

The amount of silicone polymer present in the composition can vary considerably, but preferably it is present in an amount sufficient so that the composition is transparent after it has been applied to the surface, dried and heated. Typically, the silicone polymer is present in relative amounts of about 1 to 20 percent by weight preferably about 3 to 6 percent by weight and, most preferably, about 6 percent by weight. Preferred silicone polymers include Dow Corning 200 Silicone (at 350, 500 or 1000 centistokes) or Masil EM-350 silicone emulsion, a proprietary formulation sold by PPG Industries.

The inorganic thickening agent used in the present invention may be any one of a number of natural and synthetic food-safe, inorganic materials, such as clays, silicas, aluminas, titanium dioxide (pyrogenic) and calcium and/or magnesium oxides. All of these materials are readily available from commercial sources.

Various types of clays which are useful include kaolins such as kaolinite, dickite, nacrite, halloysite and endillite; serpentine clays such as chrysotile and amesite; smectites such as montmorillonite (derived from bentonite rock), beidellite, nontronite, hectorite, saponite and sauconite; illites or micas; glauconite; chlorites and vermiculites; attapulgite and sepiolite. Mixed layer clays exhibiting intercalation of mineral sandwiches with one another may be used, such as, for example, mixed-layer clay mineral sheets of illite interspersed randomly or regularly with montmorillonite, or chlorite with one of the other types of clay, such as vermiculite. Other useful clays include amorphous clays, such as allophane and imogolite, and high-alumina clay minerals such as diaspore, boehmite, bibbsite and cliachite.

Various types of silicas which are useful include diatomite, precipitated silica and fumed silica. Various types of aluminas may be used, as well as various types of calcium and magnesium oxides.

The thickening agent preferably forms stable suspensions such that it stays suspended within the aqueous composition indefinitely without repeated agitation, such as shaking, by the user. An organic thickening agent such as food grade hydroxypropylmethyl cellulose (commercially available as Methocel K-100M) can be used for this purpose. Preferred inorganic thickening agents are clay materials, more preferably smectite clay materials having the following formulae:

| Mineral | Formula |
|---|---|
| montmorillonite | $[Al_{1.67}Mg_{0.33}(Na_{0.33})]Si_4O_{10}(OH)_2$* |
| beidellite | $Al_{2.17}[Al_{0.33}(Na_{0.33})Si_{3.17}]O_{10}(OH)_2$ |
| nontronite | $Fe(III)[Al_{0.33}(Na_{0.33})Si_{3.67}]O_{10}(OH)_2$ |
| hectorite | $[Mg_{2.67}Li_{0.33}(Na_{0.33})Si_4O_{10}(OH,F)_2$ |
| saponite | $Mg_{3.00}Al_{0.33}(Na_{0.33})Si_{3.67}]O_{10}(OH)_2$ |
| sauconite | $[Al_{0.99}Si_{3.01}]O_{10}(OH)_2X_{0.33}$ |

*$Na_{0.33}$ or $X_{0.33}$ refers to the exchangeable base (cation) of which 0.33 equivalent is a typical value.

Of these smectite class, montmorillonite clays derived from bentonite rock are particularly preferred. The chemical analysis for montmorillonite clay from Montmorillon, France is as follows:

| Component | % |
|---|---|
| $SiO_2$ | 51.14 |
| $Al_2O_3$ | 19.76 |
| $Fe_2O_3$ | 0.83 |
| MnO | trace |
| ZnO | 0.10 |
| MgO | 3.22 |
| CaO | 1.62 |
| $K_2O$ | 0.11 |

-continued

| Component | % |
|---|---|
| $Na_2O$ | 0.04 |

Montmorillonite has a three-layer plate-shaped crystalline structure. The three-layer sheets or platelets consist of a middle octahedral alumina layer and two outer tetrahedral silica layers. Because of lattice defects in the alumina, and less often in the silica layers, the flat planar surfaces are negatively charged and have associated cations (primarily sodium and calcium) to achieve electroneutrality. Montmorillonite hydrates in the presence of water and disperses to varying degrees, depending on the nature of the cations that are loosely held and exchangeable. As hydration proceeds, the individual platelets separate and eventually form a suspension which is stabilized by electrical interactions between clay platelets and which exhibits highly non-Newtonian rheological properties.

Most preferably, the thickening agent of the invention is selected from a group of complex magnesium aluminum silicates derived from natural smectite clays by a proprietary refining process and sold by R. T. Vanderbilt Company, Inc. under the trademark VEEGUM®. Chemical analyses of these clay derivatives reveal the presence of the following compounds in the following ranges of amounts by weight percent:

| Component | % |
|---|---|
| Silicon dioxide | 62.0–69.0 |
| Magnesium oxide | 2.9–11.9 |
| Aluminum oxide | 10.5–14.8 |
| Ferric oxide | 0.7–1.8 |
| Calcium oxide | 1.1–2.4 |
| Sodium oxide | 2.2–2.6 |
| Potassium oxide | 0.4–1.9 |
| Ignition loss | 7.5–9.0 |

A particularly preferred clay derivative is a grade commercially available from R. T. Vanderbilt Company, Inc. under the trade name VEEGUM HS® and having the chemical analysis:

| Component | % |
|---|---|
| Silicon dioxide | 69.0 |
| Magnesium oxide | 2.9 |
| Aluminum oxide | 14.7 |
| Ferric oxide | 1.8 |
| Calcium oxide | 1.3 |
| Sodium oxide | 2.2 |
| Potassium oxide | 0.4 |
| Ignition loss | 7.6 |

VEEGUM HS®, in particular, forms excellent suspensions having increased viscosity in water without settling out over time or completely losing pourability.

The thickening agent and all other ingredients of the composition of the present invention are preferably food-safe, that is, nontoxic even when internally consumed at abnormally high levels over an extended period of time, such as 90 days. Preferably, the thickening agent is one that is classified by the Food and Drug Administration as "generally recognized as safe" (GRAS) as a direct human food ingredient based upon "current good manufacturing practice conditions of use." 21 C.F.R. Ch. 1, § 184.1155. An example of such a thickener is "bentonite" $(Al_2)O_3.4SiO_2.nH_2O$, CAS Reg. No. 1302-78-9), which contains varying quantities of iron, alkali metal and alkaline earth metal cations in corresponding commercial products, as described at 21 C.F.R. Ch. 1, § 184.1155. VEEGUM HS® clay is a type of bentonite which contains magnesium cations.

The amount of the thickening agent present in the aqueous composition must be sufficient so that the composition is capable of forming a continuous coating with essentially no holes or gaps and capable of adhering when applied to all desired surfaces, particularly to vertical surfaces. To achieve formation of a continuous coating, the amount of thickener present in the composition of the present invention can vary widely depending on the amount of water-soluble inorganic salt present, the amount of the silicone component present, and on the amount and character of mixing used to combine the thickener with water. However, the relative amount of thickener is usually from about 0.5 to about 10 percent by weight, preferably 1.0 to 3.0 percent by weight, more preferably 2.0 to 2.5 percent by weight, and most preferably about 2.15 percent by weight. One of ordinary skill in the art can readily determine an appropriate amount of thickener.

When water is present in the composition, the preferred amounts of the thickening agent are sufficient to produce a viscous, but still sprayable liquid. Depending on the amount and type of thickener used, it may be necessary to shake the composition well before spraying.

With respect to viscosity, compositions containing many of the thickeners of the invention do not have the viscosity characteristics of Newtonian liquids in which the viscosity is constant and independent of shear rate. Instead, in many cases, the viscosity profile of the compositions is such that a certain minimum amount of shear stress is required before flow takes place. Such properties may be conveniently expressed in terms of a rheological measurement, yield value.

Experience has shown that the following Casson Equation basically describes the viscosity profile of most compositions suitable for use in the present invention.

$$n_{DN}=n^N+(T_o/D)^N$$

where $T$=shear stress;

$T_o$=yield value (dynes/$cm^2$);

$D$=shear rate ($sec^{-1}$);

$n_D$=viscosity at shear rate D;

$n_\infty$=viscosity at infinite shear; and $N$=exponent (commonly 0.5).

Assuming that $N=0.5$, $$\sqrt{n_D} + \sqrt{n_\infty} + \sqrt{T_o/D}$$

and, multiplying through by D, remembering that $n=T/D$, $$\sqrt{T} = \sqrt{n_\infty} \cdot \sqrt{D} + \sqrt{T_o} .$$

Thus, a plot of $\sqrt{T}$ vs. $\sqrt{D}$ should be a straight line with a slope of $\sqrt{n_\infty}$ and a y intercept of $\sqrt{T_o}$.

For the aqueous compositions of the invention, the yield value before application to appropriate surfaces should preferably be greater than about 10 dynes/$cm^2$ to prevent settling out of the contents of the composition, for example, during storage. However, the yield value should be somewhat less than about 2.5 dynes/cm$^2$ immediately after application to assure a continuous coating with essentially no gaps or holes. Further, a recovery of the yield value to about 5 dynes/cm$^2$ or higher shortly after application is desirable to prevent running or sagging of the coating. A balance exists between preventing undue sagging by prompt recovery of yield value, on one hand, and allowing sufficient time for initial flow of the composition onto the surface to form a continuous coating, on the other hand. For any given thickener useful in the present invention, one skilled in the art can routinely determine the proper balance.

Another embodiment of the invention comprises an aqueous composition not having the above-indicated yield values, but which is capable of forming a continuous coating adhered to all desired surfaces by application, for example by spraying, to a preheated surface.

Yet another embodiment comprises a solid or semi-solid composition, such as a waxy solid, not having the above-indicated yield values, but which can be evenly applied by spreading or rubbing onto the desired surface.

The alkaline, water-soluble, food-safe inorganic salt of the composition can be any water-soluble salt or combination of salts, preferably capable, either alone or in combination with a foodsafe acid or base, of imparting moderate alkalinity to the composition. The salt is preferably also capable of forming, when mixed with the thickener in the composition of the invention, a dried film which is readily removable with water or an aqueous solution. Preferably, the water-soluble salt is also hygroscopic.

Examples of useful water-soluble salts include: phosphates such as monosodium phosphate, disodium phosphate, and trisodium phosphate; condensed phosphates such as sodium tripolyphosphate, tetrasodium pyrophosphate, sodium acid pyrophosphate, and sodium hexametaphosphate, and the corresponding potassium and lithium phosphates such as tripotassium phosphate and potassium tripolyphosphate; alkali metal carbonates such as sodium, potassium, and lithium carbonates; and soluble silicates such as sodium ortho-silicate, anhydrous sodium metasilicate, pentahydrate sodium metasilicate, 2.0 ratio sodium silicate, 2.4 ratio sodium silicate, and 3.22 ratio sodium silicate.

Although some of these water-soluble salts are acidic, it is intended that such acidic salts be used in combination with any suitable food-safe base. As used herein, the combination of acidic water-soluble salts and optionally a food-safe base is included within the meaning of the term alkaline, water-soluble salt. A preferred group of inorganic salts includes the phosphates and condensed phosphates with tripotassium phosphate, sodium tripolyphosphate and potassium tripolyphosphate being particularly preferred.

The amount of the alkaline, water-soluble inorganic salt present in the composition of the invention can vary widely. The maximum amount that can be present is limited only by the solubility of the salt, which can be as much as 100–200 grams of the anhydrous salt per 100 grams of water (50–67% by weight).

The minimum amount is controlled by the concentration necessary so that the composition is readily removable with water or an aqueous solution after the composition has been dried and soiled. However, an additional amount of at least one other neutral salt, for example, an alkali metal halide salt such as NaCl or KCl, may desirably be added to maintain a sufficiently high yield value and to assure easy and ready removability of the dried film. Further, it may be desirable to add minor amounts of a second salt which is hygroscopic to facilitate the at least partial hydration of the dried film. It is desirable that the dried film at least partially hydrate because this is thought to contribute to saponification of spattered fat by the film. Preferably, the minimum relative amount of water-soluble inorganic salt in the composition varies from about 0.05 to about 3.0 percent by weight.

In a particularly preferred embodiment, the relative amount of inorganic salt present in the composition varies from about 0.05 to about 67 percent by weight, typically from about 1.0 to about 50 percent by weight, preferably from about 1.5 to about 25 percent by weight, most preferably from about 2.0 to about 12 percent by weight.

If it is desired that the inventive compositions have a more dry consistency after heating at 300° F. to 600° F., one could incorporate food-safe mineral oil. The mineral oil used in making the composition described can be any food-safe mineral oil, which preferably, has a minimum viscosity of 34 5 centistokes at 40° C., such as white mineral oil like Drakeol 35 by Penreco or Kaydol by Witco.

The mineral oil produces limited smoking in the temperature range of about 470° F. to 530° F., but the film preferably remains transparent up to about 580° F. At about 600° F., films of this invention generally become translucent and remain translucent up to 800° F. Optimum film transparency occurs at about 350° F. to 575° F.

The amount of food-safe mineral oil present in the composition can vary considerably, but preferably it is present in an amount sufficient, in combination with the amount of the silicone polymer, so that the composition is transparent or translucent after it has been applied to a surface, dried, heated, and soiled. In other words, since the silicone polymer is generally more expensive than the mineral oil, a portion of the silicone polymer can be replaced by an amount of mineral oil such that the resulting composition is transparent or translucent under the conditions described in the preceding sentence. Typically, the mineral oil is present in relative amounts of 0 to 10 percent by weight, preferably about 1 to 3 percent by weight and, most preferably, about 3 percent by weight.

In an aqueous composition, prior to application to a desired surface, the amounts of thickening agent, inorganic salt, silicone polymer, and mineral oil vary in relative terms of parts by weight (based on 100 parts total weight) to the same extent as expressed above in percent by weight.

The composition of the invention can further include a food-safe, alkali-stable dye. The dye, when present helps the user of the invention to see the aqueous composition as it is being applied to appropriate surfaces which may be dimly lit, such as those inside an oven or broiler. In this way, over-application, under-application, or gaps in the continuous coating can be detected and prevented. Examples of suitable dyes include FD&C Blue #1, FD&C Yellow #6, FD&C Red #3, FD&C Green #3, FD&C Yellow #5 and mixtures thereof.

Aqueous compositions of the invention may be prepared by mixing the ingredients with water or, in the case of nonaqueous formulations, simply by mixing together the dry thickening agent, the dry inorganic salt, and the silicone polymer, either alone or with other nonaqueous carriers which do not affect the essential characteristics of the invention. The preferred mode of preparing these compositions is by preparing an aqueous suspension containing the thickening agent and, optionally, the food-safe, alkali-stable dye; preparing a solution of the alkaline salt(s) and the optional dye in water; combining the suspension and the solution; and, finally, adding the silicone polymer to form the aqueous composition of the invention.

To prepare the suspension containing the thickening agent, the thickener is slowly added to water while agitating the mixture continuously. The rate of addition should be slow enough to avoid any agglomeration of the thickener because, with some thickeners, a rate of addition which is too fast can cause gels which do not readily disperse and cause a significant delay in production.

The temperature of the water used to make the suspension may vary widely, for example, from about 4° to about 60° C. The use of warm or hot water (from about 26° C. to about 60° C.) may accelerate the hydration of some thickeners and also produces a suspension of higher viscosity.

The type of mixing equipment employed is not critical, and either high or low speed mixing may be used. Examples of appropriate types of agitation for room temperature water (26° C.) include the use of a Waring Blender (3 minutes, 18,000 RPM for a 500 gram batch), an Eppenbach Homo-Mixer (15 minutes, 5,450 RPM for a 1,000 gram batch) or a "Lightnin"-type Mixer (30 minutes, 1,770 RPM for a 5 gallon batch). It should be noted, however, that high speed mixing, such as that obtained with the Waring Blender, will reduce the time required to obtain a smooth suspension and reduce the effect of water temperature, if any, on viscosity.

Once the suspension containing the thickener has been prepared, it is preferably diluted with an aqueous solution of the inorganic salt to form a mixture to which the silicone polymer, and optional mineral oil, are added. The resulting aqueous composition is then subjected to an optional final pH adjustment and mixing. The final pH adjustment may be made with any food-safe acid, preferably an inorganic food-safe acid, or with minor amounts of strong alkali such as sodium or potassium hydroxide. Typically, the pH is adjusted with a food-safe acid such as phosphoric acid.

The pH of the aqueous composition of the invention prior to application to a desired surface can vary widely, with the lower end of the useful pH range relating to the releasability or easy removal of the dried soiled film and the higher end being limited only by the possibility of eye or skin damage. Typically, the pH ranges from about 9.0 to about 14.0, preferably about 11.0 to 13.0, more preferably about 11.5 to 12.5, and most preferably about 11.8 to about 12.2.

According to the method for cleaning a surface which may be subjected to heat and is liable to soiling by organic food deposits, especially baked-on food deposits, the composition is applied to the surface, preferably when the surface is an unsoiled state but permissibly when the surface has some organic food soils remaining even after cleaning, to form a continuous coating essentially without any holes or gaps. The composition may be applied in any acceptable way. When the composition is not a liquid but in the form of a solid or semisolid, it is preferably applied by rubbing or spreading the composition onto the desired surface.

Most preferably, the composition is an aqueous composition which is applied by spraying, for example, either with a hand-pump sprayer or with an aerosol spray container. If an aerosol spray container is used, the composition of the invention may be packed together with about 1 to about 25% of an environmentally safe propellant.

After application of the aqueous composition to the desired surface, the resulting continuous coating is dried to form a continuous film adhered to substantially all portions, both clean and soiled, of the surface. The continuous coating is preferably dried by heating to drive off substantially all volatile liquids, such as water, in the composition to form a film which is initially durable and resistant to scuffing and chipping. However, the continuous coating may be dried by any one of several different methods, such as by allowing the coating to stand at room temperature for a predetermined period of time, heating the surface with which the coating is in contact, heating the convective air flow in contact with the coating, providing a forced flow of heated air, or heating the surface prior to application of the coating. It is clear from this description that heating and drying of the composition of the invention can occur simultaneously or in any order.

Preferably, the continuous coating is dried by heating the convective air flow in contact with the coating, most preferably to a temperature from about 200° F. to about 550° F., for a time sufficient to form the durable film. Typical drying times range from about 10 minutes at about 400° F. to about 30–60 minutes at about 200° F.

As set forth above, the silicone polymer or the combination of silicone polymer with mineral oil, is present in the composition of the invention in an amount sufficient so that the continuous coating referred to above is transparent or translucent after the composition has been applied to the surface, dried and heated. Preferably, the amount of silicone polymer or silicone polymer and mineral oil is sufficient so that the continuous coating is transparent or translucent immediately after the composition has been applied to the surface, dried, and initially heated (drying and initial heating can occur simultaneously or in any order, as explained above, and also as explained above, the composition can be applied to a heated surface) at a temperature up to 800° F., and more preferably 350° F.–575° F.

When the coating is dried by heating, the initially durable film formed is resistant to chipping and scuffing, for example, by the insertion and removal of pans and other cooking implements into and out of an oven or broiler. By formation of such a durable film, the appropriate surfaces remain essentially covered by a protective barrier which, at the very least, physically protects the oven surfaces from burned on spattered food soils.

The continuous coating becomes substantially thinner as it dries. While the thickness of the wet continuous coating may typically vary between 0.2 and 50 mils, preferably about 2.5 mils, immediately after application, the initially durable film formed by heating the continuous coating typically ranges from about 0.06 to about 15.0 mils, preferably between 0.6 and 1.5 mils, in thickness.

Substantially all of any volatile liquid present, such as water, is driven from the continuous coating if it is dried by heating and the resulting dried film typically contains less than 0.1% volatile liquid at the conclusion of the drying step. However, if a hygroscopic inorganic salt is used and, if no heat is used to dry the initial coating, the dried film may still contain at least part of any original water which may have been present in the composite as applied, depending upon the ambient humidity and the particular hygroscopic salt employed.

Further, a film comprising a hygroscopic salt which is exposed to the atmosphere for a prolonged period of time may gain water from the atmosphere, even if most of the water which may have been present in the composition as applied was originally lost during a heating step. The physical consistency of the film in this hydrated state can be quite similar to that of stiff "cake icing" or a paste. Thus, the at least partially hydrated film may not be as durable as the initially dried film. However, it is found that, during normal use, the at least partially hydrated film remains continuous and may be, of course, redried when the oven is heated.

When the film contains a hygroscopic salt which contains water either retained or absorbed from the atmosphere, the resulting state of hydration, as explained above, is thought to contribute to an ability of the film to at least partially saponify fatty food soils spattered onto the film, for example, during use of an oven or broiler used for the cooking or baking of food.

The relative levels of the components of any dried film is the same as the continuous coating from which it is formed when expressed in terms of parts by weight. A dried, initially durable film generally comprises from about 0.5 to about 10 parts, preferably from about 1.0 to about 3.0 parts, by weight of the thickener; from about 0.05 to about 67 parts, preferably from about 1.0 to about 50 parts, by weight of the inorganic salt; from about 1 to about 20, preferably from about 3 to about 6 parts, and most preferably about 6 parts by weight of the silicone polymer; and from about 0 to about 10 parts, preferably from about 1 to 3 parts, by weight of the mineral oil immediately after the drying step.

After the drying step, the surfaces, covered with the dried film of the invention, can be used in the normal fashion and allowed to accumulate a substantial amount of spattered food soils and fats for a period of time up to several days or even weeks. When the user desires to remove the food soils accumulated on the film, such as when such a high level of soil as would be undesirable from an aesthetic or food quality standpoint has accumulated, the soiled film may be quickly and easily removed with water alone or with an aqueous solution, preferably by wiping the surface with a wet wiping implement, such as a cloth or paper product, sponge, scrub, pad or brush.

Depending on the structural complexity of the surface, removal of the soiled film can usually be performed in less than about 45 minutes, preferably less than about 30 minutes and, most preferably, in a few minutes (typically under 15 minutes, generally under 10 minutes, and often under 5 minutes). After the soiled film has been removed from the surface, the composition may be reapplied to the surface to further protect it from food soils, especially burned-on food soils, and to continue possible saponification of spattered fatty food soils.

The compositions of the present invention can be evaluated for ease of removal, cleaning and flaking tendency. To one half of an aluminum or steel panel, a 6 mil thick coating of the tested composition is applied, and the panels are placed in an oven for two hours at 400°-450° F. A 20% shortening solution is prepared, containing 20 g of liquid shortening and 80 g of acetone. The hot panels are removed from the oven, the shortening solution is applied, and the panels are returned to the oven to bake overnight (or at least 18 hours). The panels are removed from the oven and cleaned with a wet paper towel. The cleaning time should not exceed 15 seconds, with the same light-handed cleaning pressure being applied through 22-25 circular motions. The cleaning and ease of removal for the treated portion of the panels are evaluated according to the following scale:

Cleaning
- 4: 75-100% soil removal
- 3: 50-75% soil removal
- 2: 25-50% soil removal
- 1: 0-25% soil removal Ease of Removal
- 4: easily removed with light pressure
- 3: easily removed with moderate pressure
- 2: moderate removal with heavy pressure
- 1: difficult to remove.

To determine degree of flaking and soil removal, three, preweighed stainless steel panels are used. To each panel, 0.3 g of solid shortening is applied and spread evenly. The panels are heated to 400° F. for three hours. Afterwards they are cooled and submerged in water baths for 30 minutes. Any loose soil is removed by dipping action in the water bath, with no agitation. Percent soil removal is calculated as follows:

$$\left(1 - \frac{\text{panel wt. after soaking} - \text{original panel wt.}}{0.3 \text{ g soil}}\right) \times 100$$

The flaking for each panel is rated as follows:
- 4: no flaking
- 3: 0-10% flaking
- 2: 10-50% flaking
- 1: 50-100% flaking It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

EXAMPLE 1

The following formations (a-g) were made in accordance with the procedures described above. Formulation (a), which represents a commercial product sold under the trade name Kote, does not contain a food-safe silicone polymer of the present invention. Formulations (b-g) are directed to various embodiments of the invention.

| | Formulations | | | | | | |
|---|---|---|---|---|---|---|---|
| | a | b | c | d | e | f | g |
| Water | 85.33 | 85.43 | 90.43 | 71.43 | 88.43 | 85.43 | 85.33 |
| Veegum HS | 2.6 | 2.6 | 2.6 | 2.6 | 2.6 | 2.6 | 2.6 |
| Soybean Oil[1] | 6.1 | — | — | — | — | — | — |
| Dow Corning | — | 6.0 | — | — | — | — | — |

-continued

| | Formulations | | | | | | |
|---|---|---|---|---|---|---|---|
| | a | b | c | d | e | f | g |
| 200 Silicone Fluid - 1000 Centistokes | | | | | | | |
| Dow Corning 200 Silicone Fluid - 350 Centistokes | — | — | 1.0 | 20.0 | — | 3.0 | 6.1 |
| Mineral Oil 350 SEC[2] | — | — | — | — | — | 3.0 | — |
| Masil EM-350[3] (Silicone emulsion) | — | — | — | — | 3.0 | — | — |
| Methocel K-100M[4] | 0.07 | 0.07 | 0.07 | 0.07 | 0.07 | 0.07 | 0.07 |
| TKP[5] | 4.5 | 4.5 | 4.5 | 4.5 | 4.5 | 4.5 | 4.5 |
| STPP[6] | 1.4 | 1.4 | 1.4 | 1.4 | 1.4 | 1.4 | 1.4 |

[1]Partially hydrogenated and winterized.
[2]Product of Sonneborn Division, Witco Chemical Co.
[3]Product of PPG/Mazer.
[4]Food grade hydroxymethylpropyl cellulose.
[5]Tripotassium phosphate.
[6]Sodium tripolyphosphate.

EXAMPLE 2

The oven pretreatment compositions of Example 1 were evaluated for smoke point and clarity as a function of temperature. The compositions were applied by a trigger-type spray bottle to thoroughly cleaned and dried aluminum (type A-36) or steel (type R-36) panels to form a 6 mil thick coating. The panels are available from Q-Panel, Cleveland, Ohio. Film thickness was measured with a wet film gauge.

Two panels were used for each evaluation. The coated panels were placed on a Dow Corning hot plate. The panels were heated slowly. Temperature readings were made using a surface probe thermocouple, and visual observations were recorded. The following table summarizes the results:

| Formulation | Smoke Point | Clarity |
|---|---|---|
| a | 470° F. | Becomes translucent beginning at 500° F.; becomes opaque at 570° F. |
| b | >700° F. | Transparent up to 600° F.; at 610° F. becomes translucent and develops tan color. |
| c | >700° F. | Transparent up to 600° F. for approximately one day of use. |
| d | >700° F. | Transparent for five days of continuous oven use at 580° F. |
| e | >700° F. | Retains transparency up to 575° F. |
| f | 470° F. | Transparent up to 600° F. |
| g | >700° F. | Transparent at 580° F. for 2-3 days; translucent at 600° F.; clarity influenced by degree of food soiling. |

EXAMPLE 3

Commercial Scale Manufacturing Process

Eleven thousand twenty pounds of water were heated to 150° F. in an ultra clean stainless steel mixing tank. With continued agitation, 680 pounds of VEEGUM HS ® was poured through a ¼ inch mesh galvanized screen into the water slowly to avoid any agglomeration of the VEEGUM HS ®. VEEGUM HS ® solution was homogenized with continued agitation, to which 5,440 pounds of water were added.

To 1,560 pounds of food grade polydimethylsiloxane in a second ultra clean stainless steel mixing tank, 18 pounds of food grade hydroxypropylmethyl cellulose were added. The solution was mixed until all ingredients are completed suspended. The contents of the second tank were added to the first with continued agitation and homogenization for two hours.

To 5,440 pounds of water in a third ultra clean stainless steel mixing tank, 1,150 pounds of anhydrous food grade tripotassium phosphate, 360 pounds of food grade sodium tripolyphosphate were added. The solution was mixed until all ingredients are completely dissolved.

The contents of the third tank were added to the first tank with agitation and homogenization. Agitation was continued for 30 minutes.

To the first tank, 1.25 pounds of FD&C Blue #1 Dye was added with agitation. After ½ hours of mixing, the resulting suspension was drained and packaged.

What is claimed is:

1. A food-safe composition for the pretreatment of a surface that is liable to soiling by organic food deposits, said composition consisting essentially of:
   a. a food-safe, inorganic thickening agent which is substantially insoluble in an alkaline aqueous composition and which is present in an amount sufficient so that, during application to the surface, the composition is capable of forming a continuous coating adhered to all desired portions of the surface;
   b. an alkaline, food-safe, water-soluble inorganic salt in an amount sufficient so that the composition is readily removable with water or an aqueous solution after the composition has been dried and soiled;
   c. a food-safe silicone polymer of the formula I $$(CH_3)_3SiO[SiO(CH_3)_2]_nSi(CH_3)_3,$$

wherein n represents the number of polymer units needed to make the silicone polymer resistant to oxidation, shear, or decomposition at elevated temperatures, which silicone polymer is present in an amount sufficient so that the continuous coating is transparent or translucent after the composition has been applied to the surface and dried; and optionally
   d. a food-safe mineral oil, wherein, when said food-safe mineral oil is included in said food-safe composition, said mineral oil and said silicone polymer are present in a combined amount sufficient so that the composition is transparent or translucent after the composition has been applied to the surface and dried.

2. The food-safe composition of claim 1, wherein the silicone polymer has a minimum viscosity of 350 centistokes.

3. The food-safe composition of claim 1 wherein the composition is a sprayable liquid.

4. The food-safe composition of claim 1 wherein the composition is a solid or semisolid.

5. A food-safe composition for the pretreatment of a surface that is liable to soiling by organic food deposits, said composition consisting essentially of:
   a. water;
   b. a food-safe, inorganic thickening agent which is a smectite clay material and is present in an amount sufficient so that the composition is capable of forming a continuous coating adhered to all desired portions of the surface;

c. at least one alkaline, food-safe, water-soluble inorganic salt in an amount sufficient so that the composition is readily removable with water or an aqueous solution after the composition has been dried and soiled;

d. a food-safe silicone polymer of the formula I $(CH_3)_3SiO[SiO(CH_3)_2]_nSi(CH_3)_3,$ wherein n represents the number of polymer units needed to make the silicone polymer resistant to oxidation, shear, or decomposition at elevated temperatures, which silicone polymer is present in an amount sufficient so that the continuous coating is transparent or translucent after the composition has been applied to the surface and dried; and optionally e. a food-safe mineral oil, wherein, when said food-safe mineral oil is included in said food-safe composition, said mineral oil and said silicone polymer are present in a combined amount sufficient so that the composition is transparent or translucent after the composition has been applied to the surface and dried.

6. The food-safe composition of claim 5, wherein the silicone polymer has a minimum viscosity of 350 centistokes.

7. The food-safe composition of claim 5, wherein the thickening agent contains predominantly montmorillonite clay.

8. The food-safe composition of claim 5, wherein the thickening agent is a magnesium aluminum silicate.

9. The food-safe composition of claim 5, wherein the thickening agent is present in said composition in an amount of about 0.5 to about 10 percent by weight.

10. The food-safe composition of claim 9, wherein the thickening agent is present in said composition in an amount of about 1.0 to about 3.0 percent by weight.

11. The food-safe composition of claim 5, wherein at least one water-soluble, inorganic salt is selected from the group consisting of phosphates and condensed phosphates.

12. The food-safe composition of claim 11, wherein at least one water-soluble, inorganic salt is selected from the group consisting of tripotassium phosphate and sodium tripolyphosphate.

13. The food-safe composition of claim 5, wherein the water-soluble inorganic salt is present in said composition in an amount of about 0.05 to about 67 percent by weight.

14. The food-safe composition of claim 5, wherein the silicone polymer is polydimethylsiloxane.

15. The food-safe composition of claim 5, wherein the mineral oil has a minimum viscosity of 34.5 centistokes.

16. The food-safe composition of claim 15, wherein the mineral oil is white mineral oil.

17. The food-safe composition of claim 5, wherein the silicone polymer is present in said composition in a relative amount of about 1 to 20 percent by weight.

18. The food-safe composition of claim 5, further consisting essentially of an alkali metal halide salt.

19. The food-safe composition of claim 5, further consisting of a food-safe, alkali-stable dye.

20. The food-safe composition of claim 5, wherein the composition, prior to application to the surface, has a pH from about 9 to about 14.

21. A food-safe composition for the pretreatment of a surface which is liable to soiling by baked-on organic food deposits consisting essentially of:

a. water;

b. a food-safe, inorganic thickening agent which is a magnesium aluminum silicate, said thickening agent being present in said composition in an amount of about 0.5 to about 10 percent by weight, so that the composition is capable of forming a continuous coating adhered to all desired portions of the surface;

c. at least one alkaline, food-safe, water-soluble inorganic salt selected from the group consisting of tripotassium phosphate, trisodium phosphate, sodium tripolyphosphate and potassium tripolyphosphate in an amount in said composition of about 0.05 to about 67 percent by weight, so that the composition is readily removable with water or an aqueous solution after the composition has been dried and soiled;

d. a food-safe silicone oil which is resistant to oxidation, shear, or decomposition at elevated temperatures and which is present in the composition in an amount of 1 to 20 percent by weight, so that the continuous coating is transparent or translucent after the composition has been applied to the surface and dried;

e. an FD&C # Dye present in said composition at an amount of about 0.01 to about 0.03 percent by weight; and optionally f. a food-safe white mineral oil present in the composition in an amount of 0–10 percent by weight, wherein when said mineral oil is included in said composition, said mineral oil and said silicone oil are present in a combined amount so that the composition is transparent or translucent after the composition has been applied to the surface and dried;

wherein the composition, prior to application to the surface, has a pH of about 11.5 to 12.5.

* * * * *